Guerrant & Field.
Rat-Trap.
N° 73527     Patented Jan. 21, 1868.

Witnesses.
Chas. D. Smith
Chas. A. Pettit

Inventors.
Guerrant & Field
Per Munn & Co.
Attorneys

United States Patent Office.

JOHN C. GUERRANT AND BENTON J. FIELD, OF LEAKSVILLE, NORTH CAROLINA.

Letters Patent No. 73,527, dated January 21, 1868.

IMPROVED RAT-TRAP.

*The Schedule referred to in these Letters Patent and making part of the same.*

TO ALL WHOM IT MAY CONCERN:

Be it known that we, JOHN C. GUERRANT and BENTON J. FIELD, of Leaksville, in the county of Rockingham, and State of North Carolina, have invented a new and useful Improvement in Rat-Traps; and we do hereby declare the following to be a full and exact description of the same, reference being had to the accompanying drawings, which are made part of this specification, and in which—

Similar letters of reference indicate corresponding parts in the two figures.

Figures 1, 2:
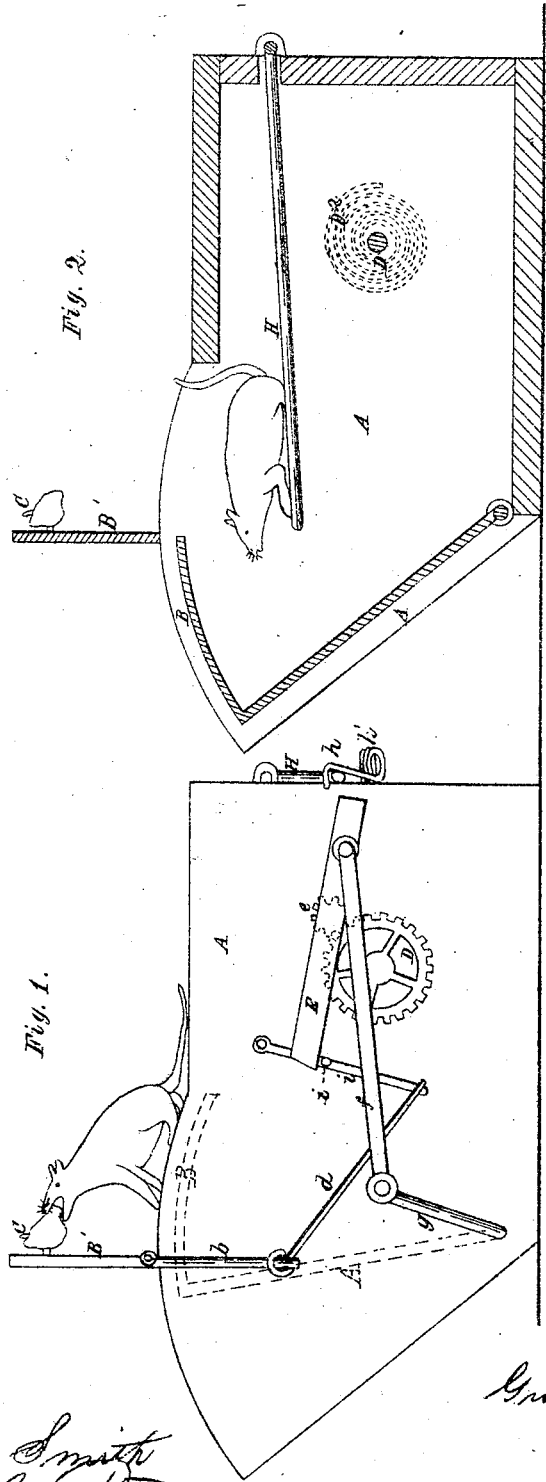
Figure 1 is a side elevation of a rat-trap embodying our invention.
Figure 2 is a vertical longitudinal section of the same.

This invention relates to a rat-trap provided with a movable platform, upon which the rat stands in order to get at the bait, the pulling of which draws a stop-pin away from a lever, which, when thus released, is actuated by a spring, and, through suitable connections, made to suddenly jerk the platform from under the rat, which, in falling into the trap, strikes a rod, which causes the spring-lever to be again actuated, so as to restore the platform to its original position.

In order that others skilled in the art to which our invention appertains may be enabled to fully understand and use the same, we will proceed to describe it in detail.

In the drawings, A may represent a box of any suitable form, and B a movable platform, which is joined to the hinged piece A', which forms one of the ends of the box A. B' represents a movable wing, to which the bait is attached, as shown at C. The wing B' has rigidly attached to it an arm, $b$, which is jointed to a connecting-rod, $d$, which in turn is jointed to a lever, $i$, which carries a stop-pin, $i'$. The hinged end-piece A' is connected with a lever, E, through the medium of an arm, $g$, and connecting-rod $f$. The axis or shaft upon which the lever E vibrates carries a pinion-wheel, $e$, which meshes with a larger cog-wheel, D, upon one end of a shaft, $D^1$, which has fixed upon its opposite extremity a coiled spring, $D^2$, shown in dotted lines in fig. 2. H may represent a bent rod, which projects into the trap, so that the rat in falling shall come in contact with its extremity, and thereby withdraw the support of the stop $h$ from the lever E, a spring, $h'$, serving to sustain the lever H in its elevated position, and hold the stop $h'$ in position to arrest the motion of the lever E at the proper moment.

The rat mounts the box A, steps upon the platform B, and pulls the bait C. This moves the wing B', arm $b$, and rod $d$ and lever $i$, and thereby draws the pin $i'$ from under the end of the lever E. The latter then makes a quick movement, performing a half revolution under the action of the spring $D^2$, and is arrested by coming in contact with the stop $h$. This movement of the lever E suddenly throws the platform B from under the rat, which then falls through the top of the trap, and strikes the rod H, thereby withdrawing the stop $h$ from the lever E, and permitting the latter to complete its revolution, and restore platform B to its original position. As soon as the rat falls through, and ceases to pull at the bait, the wing B', arm $b$, rod $d$, lever $i$, and stop $i'$ are made to resume their normal positions by the spring $j$, so that when lever E has completed its revolution, it is arrested by the pin $i'$.

Having thus described our invention, what we claim as new herein, and desire to secure by Letters Patent, is—

1. The combination of the spring $D^2$, lever E, connections $f$ $g$ A', and movable platform B, with the movable wing B', connections $b$ $d$ $i$, and stop-pin $i'$, all arranged and operating substantially as and for the purpose herein specified, 2. The combination, with the above, of the rod H, stop $h$, and spring $h'$, arranged and operating in the manner and for the purpose set forth.

JNO. C. GUERRANT,
BENTON J. FIELD.

Witnesses:
B. GROGAN,
GEO. M. GUERRANT.